United States Patent
Tromp et al.

(10) Patent No.: US 7,269,720 B2
(45) Date of Patent: Sep. 11, 2007

(54) DYNAMICALLY CONTROLLING EXECUTION OF OPERATIONS WITHIN A MULTI-OPERATION INSTRUCTION

(75) Inventors: Marcel J. A. Tromp, San Jose, CA (US); Frans W Sijstermans, Los Altos, CA (US); Sunny C Huang, Saratoga, CA (US); Rudolf H. J. Bloks, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 62 days.

(21) Appl. No.: 11/099,231

(22) Filed: Apr. 4, 2005

(65) Prior Publication Data

US 2005/0283592 A1 Dec. 22, 2005

Related U.S. Application Data

(62) Division of application No. 09/895,582, filed on Jun. 29, 2001.

(51) Int. Cl.
*G06F 9/38* (2006.01)

(52) U.S. Cl. .......................... 712/244; 712/24; 712/224
(58) Field of Classification Search .................. 712/24, 712/224, 233, 234, 244
See application file for complete search history.

(56) References Cited

U.S. PATENT DOCUMENTS 6,173,389 B1 * 1/2001 Pechanek et al. ............. 712/24
6,738,892 B1 * 5/2004 Coon et al. .................... 712/24

* cited by examiner

*Primary Examiner*—William M. Treat

(57) ABSTRACT

Techniques are described for dynamically controlling the execution of operations within a multi-operation instruction, such as a very long instruction word (VLIW). A programmable processor fetches and executes a first instruction having an operation mask. Based on the operation mask, the processor selectively executes one or more operations within a second instruction. Individual operations within a multi-operation instruction can be selectively enabled and disabled, which is advantageous in many situations, including event handling and code debugging.

21 Claims, 7 Drawing Sheets

DYNAMICALLY CONTROLLING EXECUTION OF OPERATIONS WITHIN A MULTI-OPERATION INSTRUCTION

This application is a division of application Ser. No. 09/895,582; filed 29 Jun. 2001; and entitled "Dynamically Controlling Execution of Operations Within a Multi-Operation Instruction".

FIELD

The invention relates to programmable processors and, more particularly, to multi-slot processors.

BACKGROUND

A multi-slot processor uses multiple independent functional units to process operations in parallel. One common example of a multi-slot processor is a very long instruction word (VLIW) processor. A VLIW instruction packages multiple operations into a single instruction. VLIW processors may include a plurality of instruction slots, and each slot may execute one operation of the VLIW instruction. Each slot may have an associated set of functional units, and each functional unit may be pipelined to increase processing speed. In general, only one operation is issued to any given slot at any given time.

Execution of any particular operation of a VLIW instruction may cause an event, such as an interrupt or an exception, in the processor. In response, the processor may invoke an event handler to service the event. Before servicing the event, the VLIW operations executing within the respective slots of the VLIW processor may be terminated. After servicing the event, some of the operations of the VLIW instruction that was terminated may still need to be executed. However, execution of the operation that caused the event may need to be avoided in order to ensure that the same operation does not cause the same event a second time.

SUMMARY

In general, the invention is directed to dynamically controlling the execution of operations within a multi-operation instruction. This can be achieved by incorporating an operation mask into one or more instructions. When the instruction that includes the operation mask is executed, the mask is read. Then, the execution of particular operations, such as operations within a different instruction, can be disabled or avoided according to the mask. For example, in one embodiment, selected slots of a multi-slot processor are disabled in order to ensure that particular operations are not executed.

Incorporating an operation mask into instructions can be highly advantageous in many situations, including event handling and code debugging. For example, in code debugging, it can be advantageous to execute only selected operations of an instruction to test and diagnose problems in the selected operations. This can be achieved with an operation mask. A single operation of a multi-operation instruction may be enabled according to the operation mask to test that operation, without executing the other operations of the instruction. In event handling, particular operations may need to be selectively disabled after causing an event. This can also be achieved with an operation mask.

In one embodiment, the invention provides a method that includes executing a first instruction in a programmable processor, the first instruction including an operation mask. The method may also include selectively executing one or more operations of a second instruction according to the operation mask. For example, selectively executing the operations may involve issuing each operation to a particular functional unit when one or more bits within the operation mask enable the execution of the respective operation. Alternatively, selectively executing the operations may involve selectively enabling issue slots of a multi-slot processor according to the operation mask, e.g., by propagating valid bits or invalid bits in the pipelines associated with particular issue slots.

In another embodiment, the invention provides a method that includes executing operations of an instruction in a multi-slot processor and terminating execution of the operations when one of the operations causes an event. The operations may be executed in parallel. The method may also include masking some of the operations and re-executing the non-masked operations. For example, the operation that caused the event, as well as operations that finish execution prior to the event, may be masked. The method may also include servicing the event prior to re-executing the non-masked operations, e.g., by invoking an exception handler. Upon re-execution of the non-masked operations, the method may further involve terminating the re-execution if another one of the operations causes a second event, masking a different subset of the operations, and re-executing the non-masked operations. For example the different subset may include the operations that caused the events.

In another embodiment, the invention provides a method for compiling a software program. The method includes generating a first instruction to direct the programmable processor to execute operations of a second instruction according to an operation mask within the first instruction. The method may also include generating the second instruction for execution in the programmable processor, the second instruction including a plurality of operations. The first instruction may be a change of flow instruction such as a jump instruction or a conditional jump instruction. The second instruction may be a target instruction specified by the change of flow instruction.

In another embodiment, the invention provides a processor that includes a set of functional units and a control unit to direct the functional units to execute a subset of operations within a second instruction according to an operation mask within a first instruction. The control unit may cause the processor to execute a plurality or operations within a very long instruction word in the functional units, and terminate execution of the plurality of operations if one of the operations causes an event. The control unit may also mask the operation that causes the event and re-execute the non-masked operations. For example, the processor may be a very long instruction-word processor, and may further include a fetch unit, and a decode and decompression unit.

In another embodiment, the invention provides a system that includes a memory device and a multi-slot processor coupled to the memory device. The processor may include a plurality of issue slots, a control unit, and at least one functional unit corresponding to each issue slot. The control unit may direct the functional units to execute a subset of operations within a second instruction according to an operation mask within a first instruction. The control unit may execute the first instruction in the functional units. The control unit may then selectively execute one or more operations of the second instruction in the functional units according to the operation mask in the first instruction.

In another embodiment, the invention provides a computer readable medium having a first instruction for a programmable processor stored thereon. Upon execution, the first instruction may direct the programmable processor to execute operations according to an operation mask contained within the first instruction. For example, the first instruction may be a change of flow instruction that directs the programmable processor to execute operations of a second instruction according to the operation mask contained within the first instruction. The first instruction may include a plurality of fields, at least one of the fields including the operation mask. The operation mask may include mask bits corresponding to slots of the multi-slot processor. The first instruction may also include at least one field including bits defining an address of the second instruction.

Additional details of these and other embodiments are set forth in the accompanying drawings and the description below. Other f

DETAILED DESCRIPTION

The invention provides techniques for dynamically controlling execution of operations within a multi-operation instruction, such as a very long instruction word (VLIW). Particular operations of a multi-operation instruction can be selectively enabled or disabled, which is advantageous in many situations, including event handling and code debugging. For example, in event handling and code debugging, it can be advantageous to execute only selected operations of an instruction.

Figure 1:
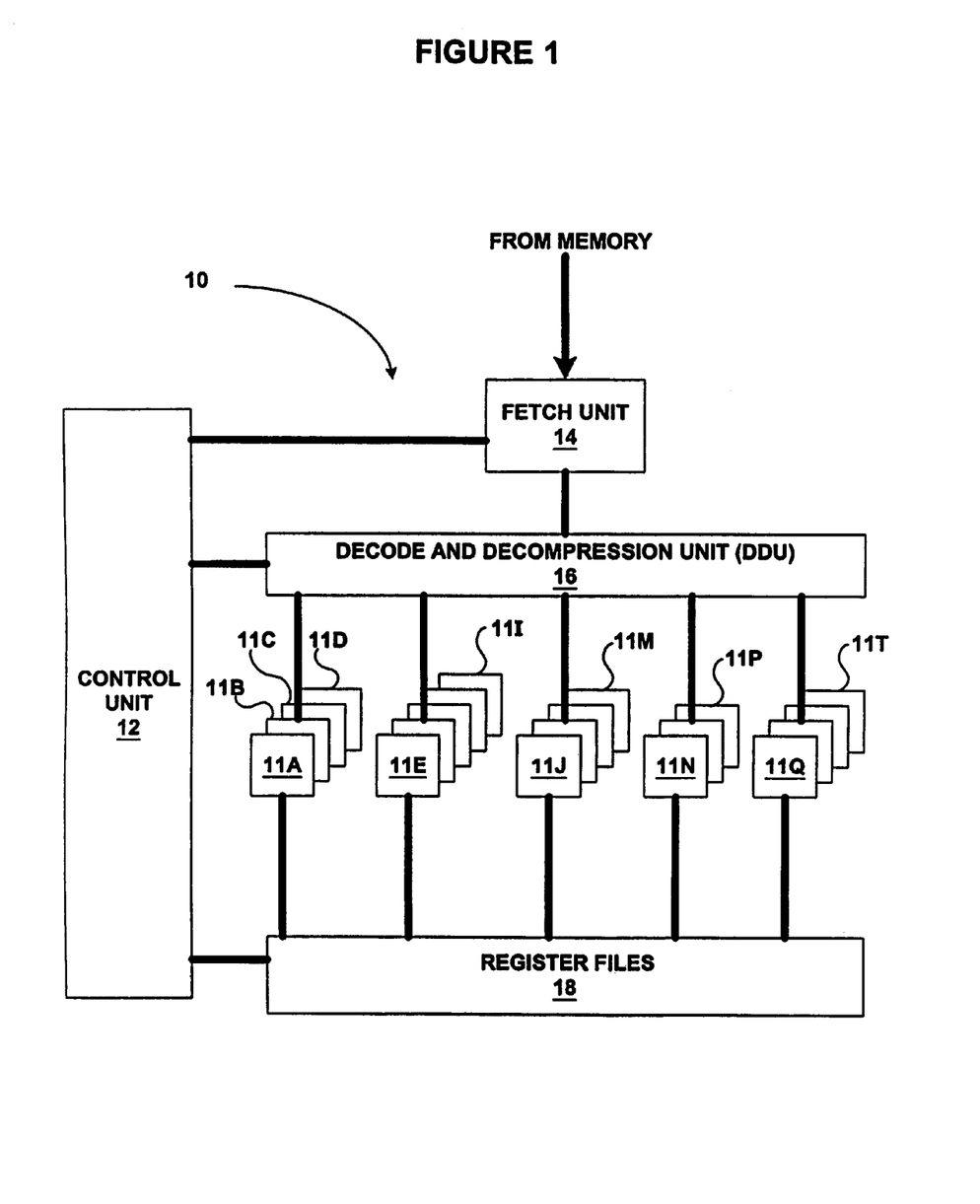
FIG. 1 is a block diagram of an exemplary multi-slot processor in the form of a VLIW processor.

FIG. 1 is a block diagram of an exemplary multi-slot processor in the form of a VLIW processor 10. According to the invention, VLIW processor 10 implements techniques for dynamically controlling the execution of operations within a VLIW by supporting, for example, instructions that include an operation mask. Execution of particular operations can be enabled or disabled according to the content of the operation mask. For example, particular slots of the VLIW processor may be selectively enabled or disabled in accordance with the operation mask.

VLIW processor 10 implements multiple independent functional units 11A-11T, collectively referred to as functional units 11. VLIW processor 10 executes instructions that package multiple operations into one very long instruction word. VLIW processor 10 may be viewed as having a plurality of instruction slots, each slot executing one operation of a VLIW instruction. Each slot may have an associated subset of the functional units 11, but only one functional unit in a given slot may be used at any given time. As shown in FIG. 1, for example, slot one includes functional units 11A-11D, slot two includes functional units 11E-11I, slot three includes functional units 11J-11M, slot four includes functional units 11N-11P, and slot five includes functional units 11Q-11T. Each respective functional unit 11 may be pipelined in order to increase processing speed.

VLIW processor 10 includes a control unit 12 that is coupled to functional units 11 and the other components of VLIW processor 10. Control unit 12 controls the flow of instructions and/or data through VLIW processor 10, including the instruction flow through the respective functional units 11. VLIW processor 10 may also include a fetch unit 14 and a decode and decompression unit (DDU) 16. Fetch unit 14 may fetch instructions from memory (not shown), for example, and provide the instructions to DDU 16 for decoding and decompression. VLIW processor 10 may also include one or more sets of register files 18 for storing results or other data during the processing of instructions.

VLIW processor 10 supports a type of VLIW instruction that includes an operation mask for dynamically controlling the execution of particular operations within other VLIW instructions. A first VLIW instruction having an operation mask may be executed in a programmable processor such that operations within subsequent VLIW instructions are selectively executed according to the operation mask. In other words, the content of the operation mask controls the execution of subsequent VLIW instructions. For example, particular operations may be enabled or disabled according to the operation mask. Thus, the content of the operation mask may identify particular operations and specify the execution of those operation.

The enabling or disabling of particular operations according to an operation mask may be achieved in a number of ways. For example, upon executing a first instruction that includes the operation mask, the mask can be read and stored within control unit 12, e.g., in a control register. Then, when executing a second instruction to which the operation mask applies, control unit 12 may direct DDU 16 to issue the operations contained in the second instruction to the appropriate functional units 11. In addition, the control unit 12 may direct DDU 16 to issue "valid bits" that are based on the operation mask, thereby enabling or disabling the execution of selected operations within the second instruction.

Alternatively, control unit 12 may enable or disable operations within an instruction by directing DDU 16 to not issue disabled operations to functional units 11. Instead, DDU 16 may issue No-Operations (NOPs) as replacements for disabled instructions. For example, the operation mask can be read upon executing a first instruction. Then, when executing a second instruction to which the operation mask applies, only those operations that were enabled by the operation mask may be issued to the functional units.

Figure 2:
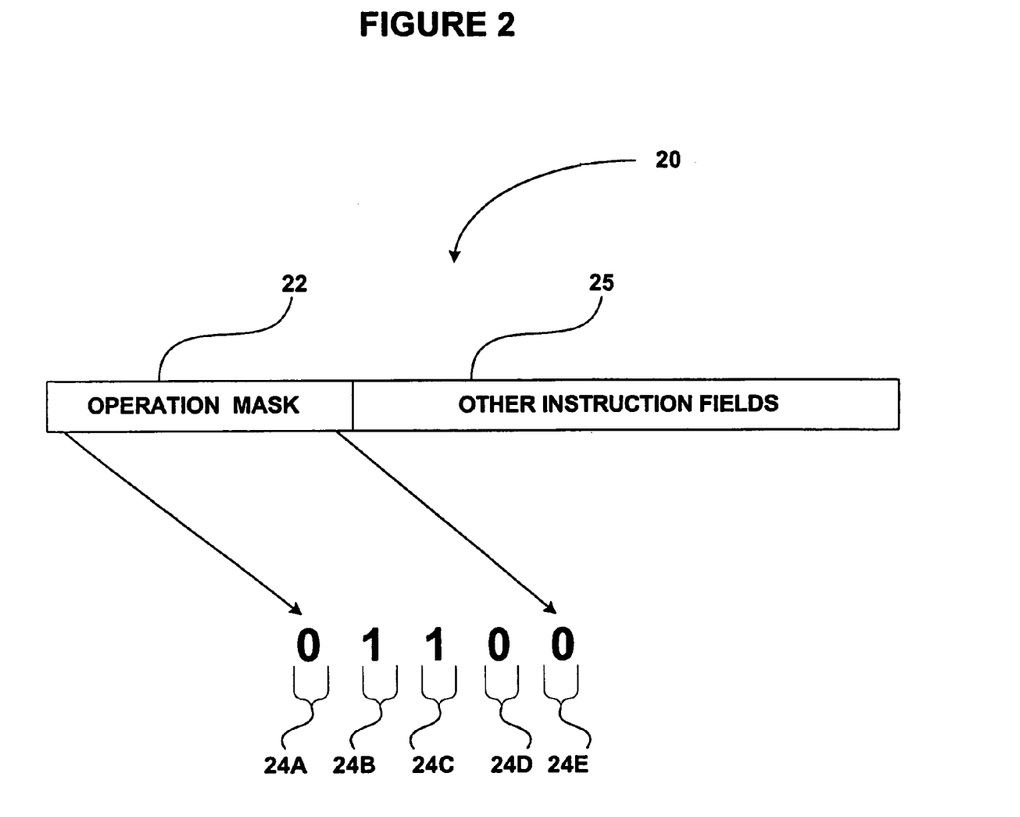
FIG. 2 illustrates an exemplary machine instruction according to the invention.

FIG. 2 illustrates an exemplary machine instruction format 20 according to an embodiment of the invention. As shown, the machine instruction format 20 includes an operation mask field defining an operation mask 22. The operation mask 22 includes a plurality of mask bits 24A-24E, each bit corresponding to a respective operation within a VLIW instruction. For example, FIG. 2 illustrates an operation mask 22 having five mask bits 24 corresponding to five operations within a VLIW instruction. Operation mask 22 may include any number of bits, however, depending on the number of operations contained within the VLIW instructions. The bits in operation mask 22 may correspond to particular operations in a given instruction.

In this manner, the execution of particular operations of an instruction may be enabled or disabled depending on the value of the corresponding bits of the operation mask 22. For example, if a particular bit is set to one, the corresponding operation may be enabled. Similarly, if a particular bit is set to zero, the corresponding operation may be disabled. Of course, an implementation could define the value of zero to indicate that an operation was enabled.

Exemplary machine instruction 20 may also include other instruction fields 25 that contain, for example, operations, addresses or other data used by the processor when executing the VLIW instruction. In one embodiment, instruction fields 25 may include the target address of a second instruction to be executed in accordance with operation mask 22.

The following expression illustrates an exemplary assembly language syntax for invoking a machine instruction that includes an operation mask:

IMASK (Mask, X)

The variable X specifies a target instruction to be executed, and the variable Mask contains a mask for enabling and disabling the operations within the targeted instruction. For example, X may specify a particular instruction, or an address or register that contains the instruction to which the operation mask applies.

Incorporating an operation mask into instructions can be highly advantageous in many situations, including event handling and code debugging. For example, in code debugging, it can be advantageous to execute only selected operations of an instruction to test and diagnose problems in the selected operations. This can be easily achieved with an operation mask. A single operation of a multi-operation instruction may be enabled according to the operation mask to test that operation, without executing the other operations of the instruction.

In event handling, particular operations may need to be selectively disabled after causing an event. Any particular operation of a VLIW instruction may cause an event, such as an interrupt or an exception, in VLIW processor 10. In response, an event handler may be invoked to service the event using functional units in the respective slots of VLIW processor 10. If one operation of a particular VLIW instruction causes an exception, for example, all of the operations in the respective slots of VLIW processor 10 may be terminated before handing the exception. After servicing the exception, some of the operations of the VLIW instruction that was terminated may still need to be executed. However, execution of the particular operation that caused the exception may need to be avoided in order to ensure that the same operation does not cause the same exception a second time. In that case, an operation mask can be used to disable the execution of the particular operation that caused the exception in order to ensure that the same event does not occur a second time.

In one embodiment, the operation mask forms part of a change of flow instruction, directing VLIW processor 10 to execute a target instruction specified by the operation mask in the change of flow instruction. A change of flow instruction is an instruction that causes VLIW processor 10 to begin execution at a new location within a program. This is typically accomplished by loading a new execution address within a program counter. Jump instructions, for example, are change of flow instructions that cause VLIW processor 10 to change the value of the program counter to the address specified in the jump instruction or to an address stored within a register. Similarly, conditional jump instructions, also referred to as branch instructions, may cause VLIW processor 10 to change the value of its program counter if the condition specified in the conditional jump instruction has been met.

By including an operation mask in a change of flow instruction, the execution of the target instruction specified in the change of flow instruction can be dynamically controlled. This can be highly advantageous for event handling. For example, a change of flow instruction may be executed after servicing an event to reset the program counter back to the value it had prior to the event. As described above, however, execution of the operation that caused the event may need to be avoided. Incorporating an operation mask in the change of flow instruction allows the operation that caused the event to be masked when the instruction is re-executed. In addition, if some of the operations of the instruction had finished execution before a particular operation caused the event, those operations that finished execution prior to event handling may be masked when the instruction is re-executed.

The following illustrates an exemplary assembly language syntax for invoking a change of flow machine instruction that includes an operation mask:

JUMP (Mask, X)

The variable Mask may specify which operations of a target instruction are masked, and the variable X specifies the target instruction. For example, X may specify a particular instruction, or an address or register that contains the instruction. Upon executing the change of flow instruction, the operation mask can be read and the program counter may be changed to indicate the instruction specified by variable X. The instruction specified by variable X can then be executed according to the operation mask as provided by the variable Mask.

Figure 3:
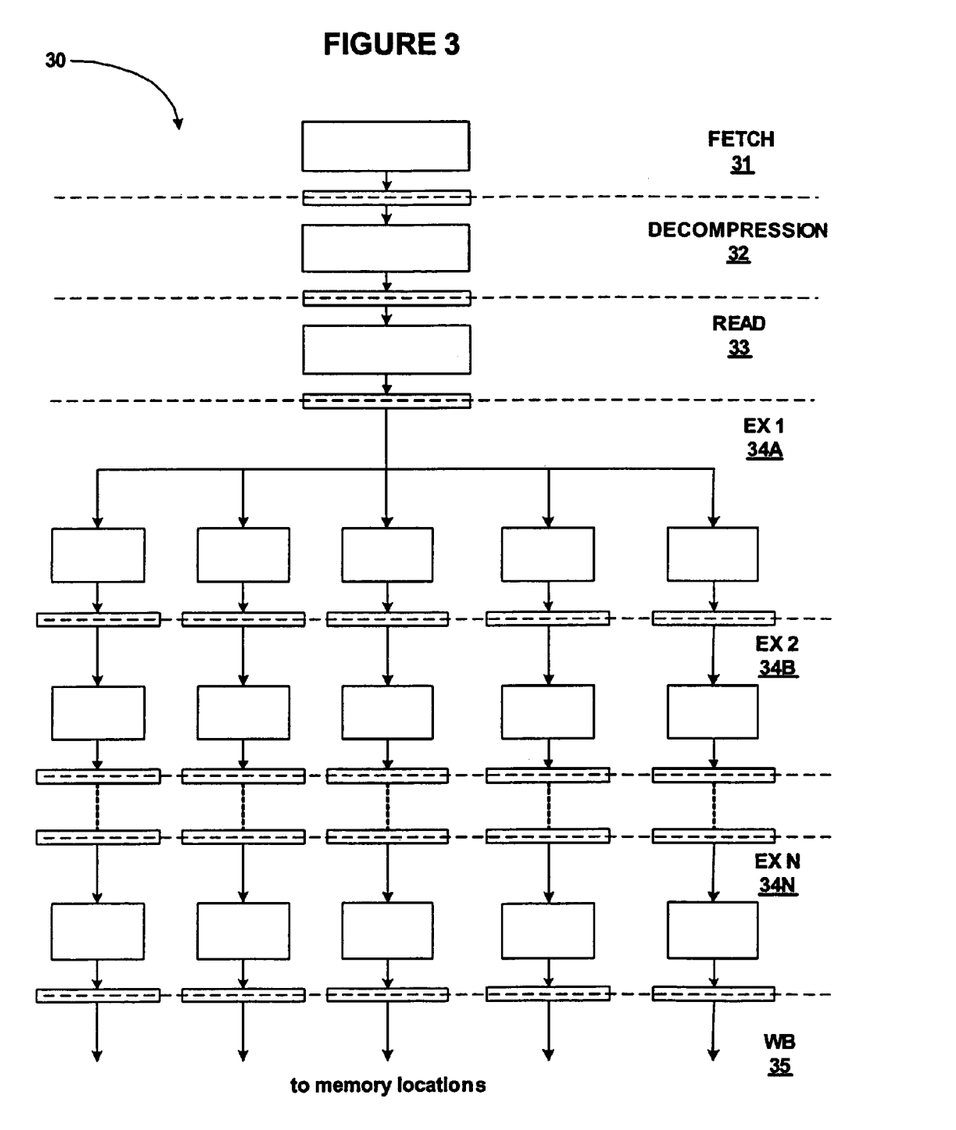
FIG. 3 is a block diagram illustrating exemplary execution pipelines in a VLIW processor.

Incorporating an operation mask in instructions can be particularly advantageous for pipelined multi-slot processors because event handling often requires operations within the pipelines to be terminated. FIG. 3 is a block diagram illustrating an exemplary execution pipeline 30. Execution pipeline 30 has multiple stages that facilitate the execution of multiple instructions (or operations) during a single clock cycle. In execution pipeline 30, an instruction is fetched, for example, by a fetch unit, during a first clock cycle. The instruction then continues down the pipeline during subsequent clock cycles. Another instruction can enter the fetch stage 31 after a previous instruction has exited to the decompression stage 32. The number of stages in the execution pipeline 30 typically defines the number of instructions that pipeline 30 can service simultaneously.

The different stages of the pipeline may operate as follows. During the fetch stage 31, one or more instructions are fetched from a memory location. During decompression stage 32, instructions are decompressed. For example, decompression information relating to an instruction may be contained in the preceding instruction. During the read stage 33, information contained within the instructions, such as an operation mask, can be read.

Multiple operations of an instruction can be sent to different execution slots to be processed in parallel during execute stages 34A-34B. For example, a first operation may be executed in a first slot and a second operation may be executed in a second slot. Similarly, third, fourth, and fifth operations can be executed respectively in the third fourth and fifth slots. Importantly, however, the execution of the respective operations can be controlled by the operation mask that is read, e.g., from another instruction, during read stage 33.

During the execution stages (EX1-EXN) 34A-34N, functional units perform specified functions such as, for example, adding or multiplying two numbers. The individual execution stages may contain specialized hardware for performing the functions including, for example, one or more arithmetic logic units (ALU's), floating-point units (FPU) and barrel shifters. A variety of data can be applied to the hardware such as the addresses generated by data address generators, data retrieved from memory or data retrieved from data registers. During write back stage (WB)

35, the results of execution are written to a memory location or data registers. The respective stages of execution pipeline 30 may include one or more storage circuits, such as a flip-flop, for storing data during processing.

As discussed, VLIW processor 10 may support instructions that include an operation mask. The mask can be read during a read stage 33, and then applied during the execution of subsequent instructions. The mask may define which operations of a different instruction will be executed in execution pipelines. For example, operations of a subsequent instruction may be enabled or disabled according to the operation mask.

Figure 4:
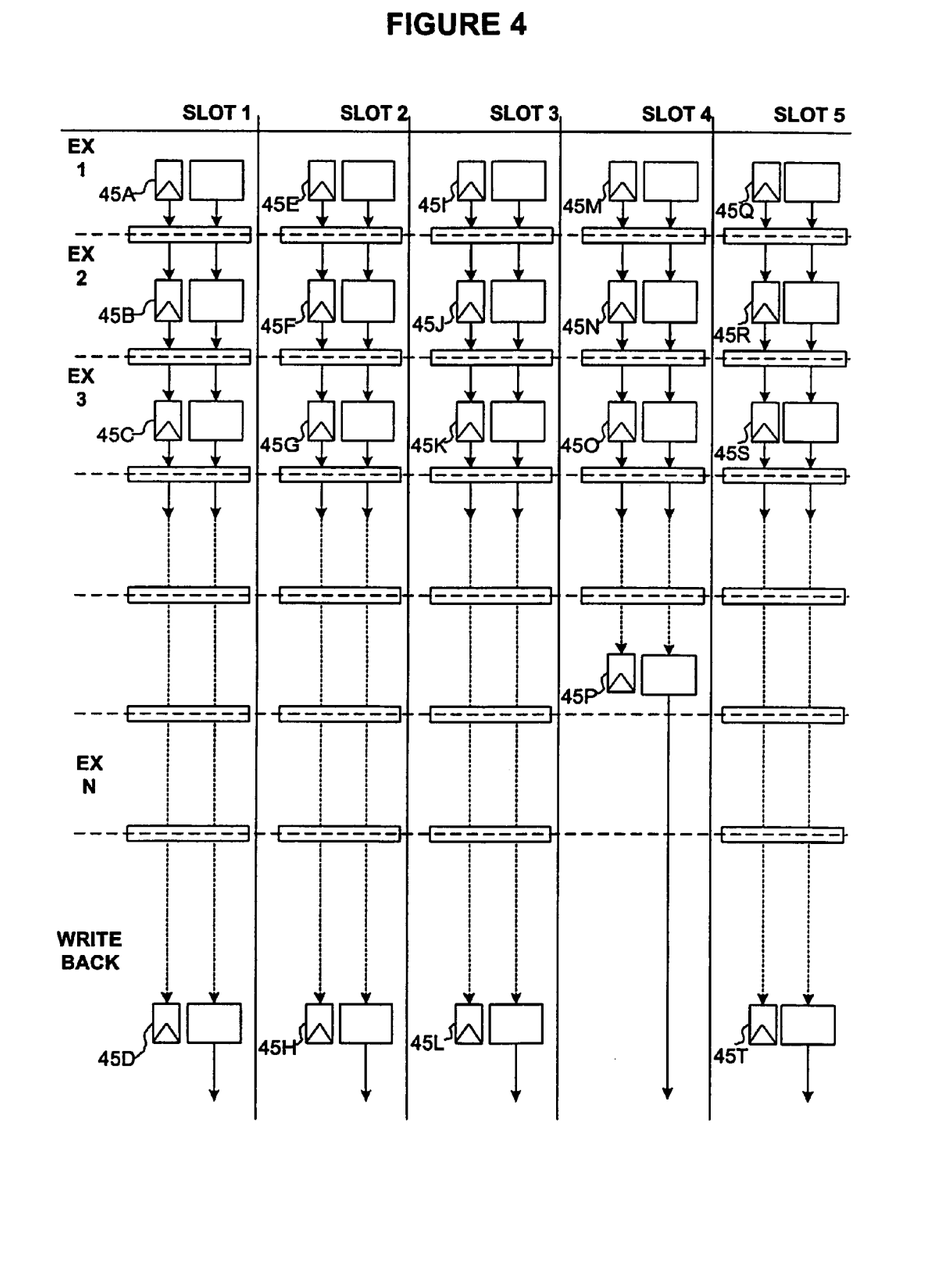
FIG. 4 is a block diagram illustrating pipelined functional units in respective slots of a VLIW processor.

FIG. 4 is a block diagram illustrating exemplary pipelined functional units in respective slots of a VLIW processor. When operations are being executed according to an operation mask, the execution of some operations may be enabled while others are disabled. As shown in FIG. 4, the pipeline stages EX1-EXN in the respective slots 1-5 each include storage circuits 45A-45T, such as flip-flops, for propagating valid bits to control the execution of the operations as they flow through the pipelined functional units. For example, if a particular operation in a particular slot has been enabled by the operation mask, storage circuits 45 may propagate a logical one as the operation flows through the execution stages to writeback stage. Similarly, the respective storage circuits 45 may propagate a zero when a particular operation in a particular slot has been disabled by the operation mask. In this manner, the execution of operations can be dynamically-controlled in a pipelined multi-slot processor.

As discussed above, one situation where an operation may need to be disabled by the operation mask is when the operation causes an event such as an interrupt or exception. Another situation where an operation may need to be disabled is when the operation finishes execution before another operation within the same instruction causes an event. In that case, both the operation that caused the event and the operation that finished execution before the event may need to be disabled when the instruction is re-executed, e.g., after servicing the event.

For example, as shown in FIG. 4, the functional units in some slots may be more deeply pipelined than others. An operation being executed in slot 4 may finish execution before operations being executed in one of the other slots finish execution. If one of the other operations causes an event after the operation in slot 4 has finished execution, both the operation that causes the event and the operation in slot 4 may be masked by the operation mask. Then, after servicing the event, the remaining operations can be re-executed. The operation corresponding to slot 4 may not need to be re-executed because it had finished execution before the event.

Figure 5:
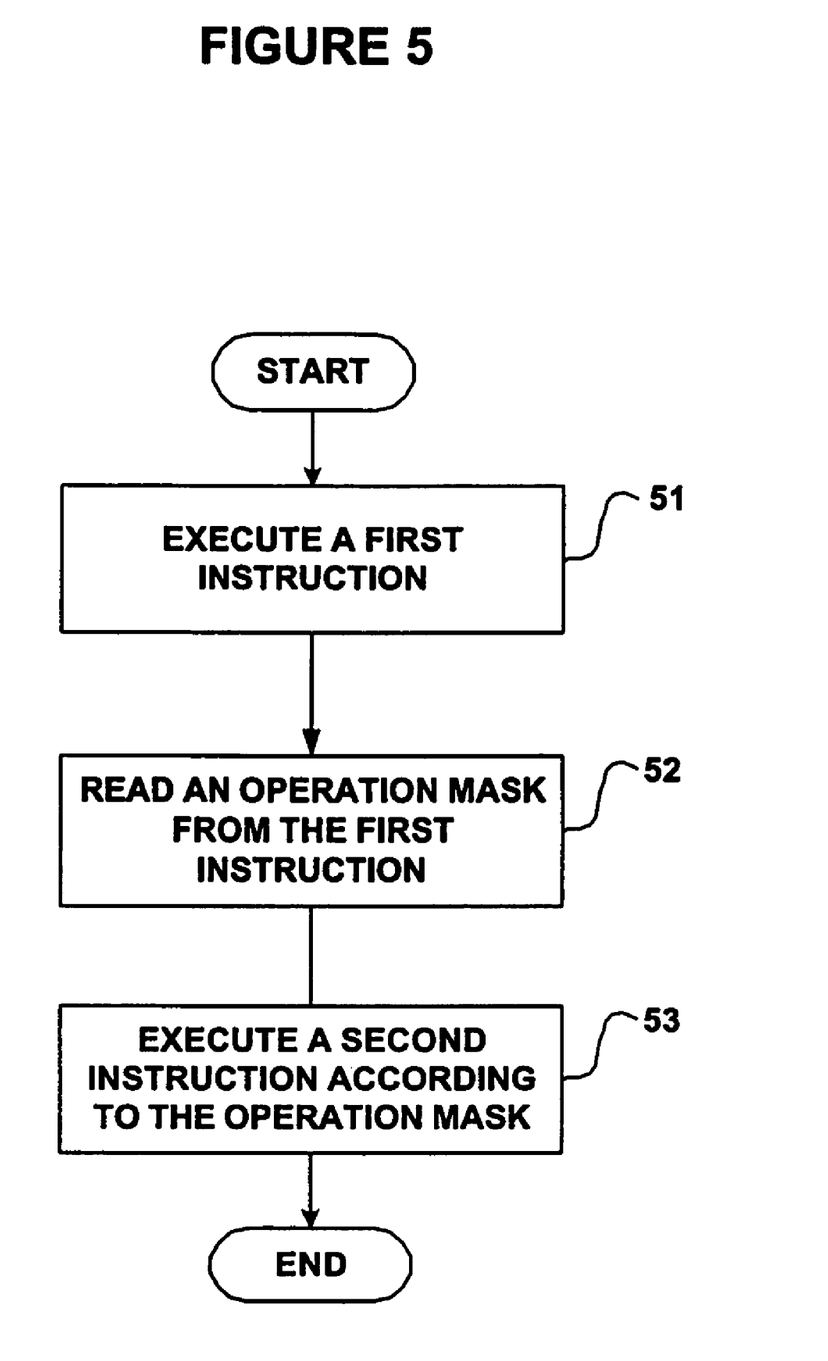
FIGS. 5-7 are flow diagrams according to embodiments of the invention.

FIG. 5 is a flow diagram illustrating an example mode of operation of processor 10. As shown, a first instruction is executed (51). An operation mask can be read from the first instruction (52). Then a second instruction can be executed according to the operation mask that was read from the first instruction (53). In this manner, the execution of operations in the second instruction can be dynamically controlled. For example, the first instruction may be a change of flow instruction that includes an operation mask and the address of a target instruction. The target instruction can be executed according to the mask.

Figure 6:
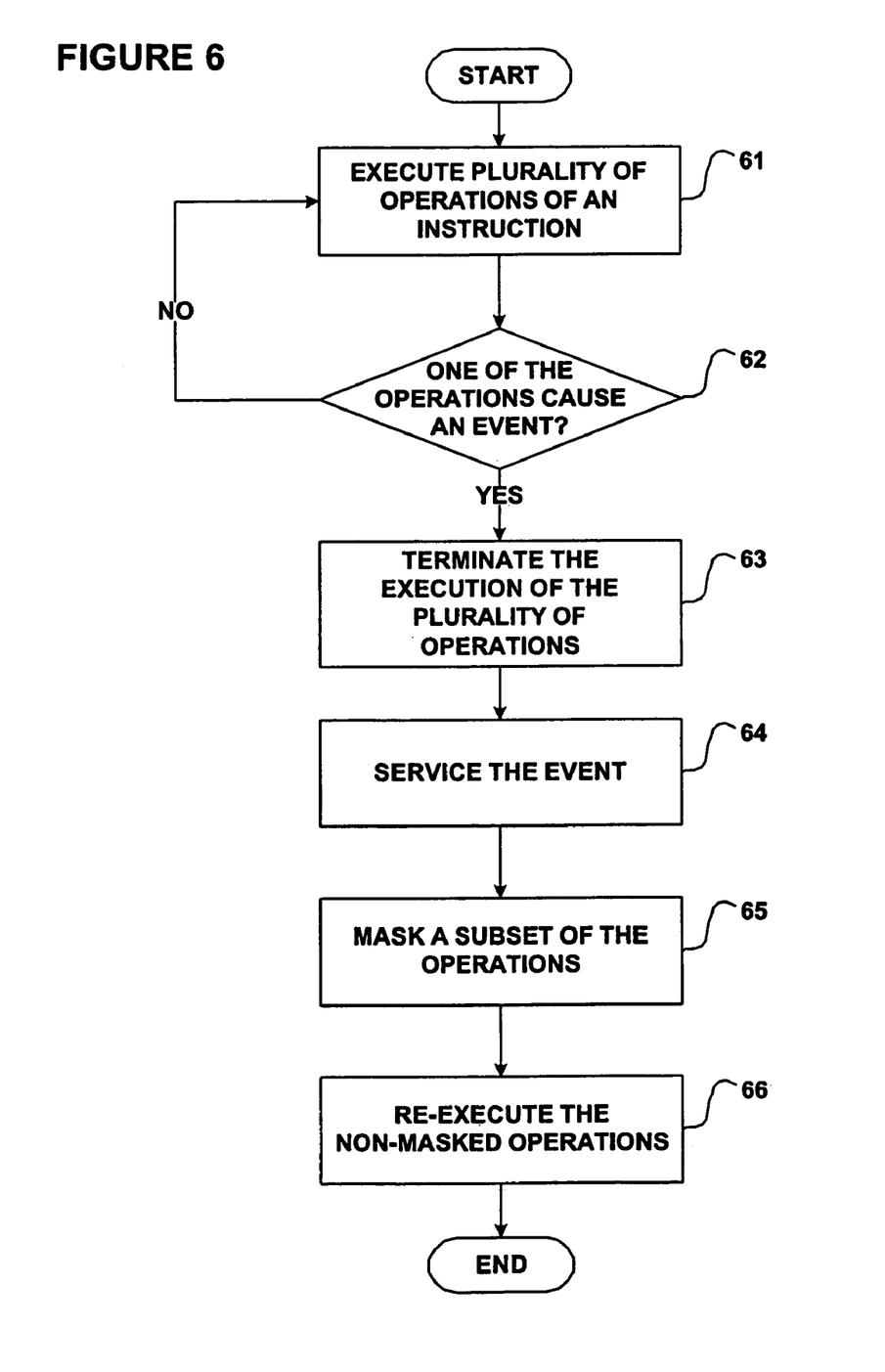

FIG. 6 is another flow diagram illustrating another mode of operation of processor 10. Processor 10 executes a plurality or operations within a multi-operation instruction (61). If one of the plurality of operations causes an event (62), the execution of the plurality of operations is terminated (63). The event may be serviced (64), e.g., by invoking an event handler. A subset of the operations can be masked (65) and the non-masked operations can then be re-executed after servicing the event (66).

The subset of operations that are masked (65) generally include the operation that caused the event. In addition, the subset of operations that are masked may include other operations, such as an operation that finished execution before the plurality of operations are terminated. Masking the subset of operations may involve masking one or more of the operations using an operation mask within a change of flow instruction at the end of the event handler. Re-executing the non-masked operations may include propagating valid bits in pipelines of particular issue slots corresponding to the non-masked operations, and propagating invalid bits in pipelines corresponding to the masked operations.

Upon re-executing the non-masked operations within the instruction, the process of FIG. 6 may be repeated. For example, if upon re-execution, another operation of the instruction causes a second event, another subset of operations can be masked, including the operation that caused the second event.

Figure 7:
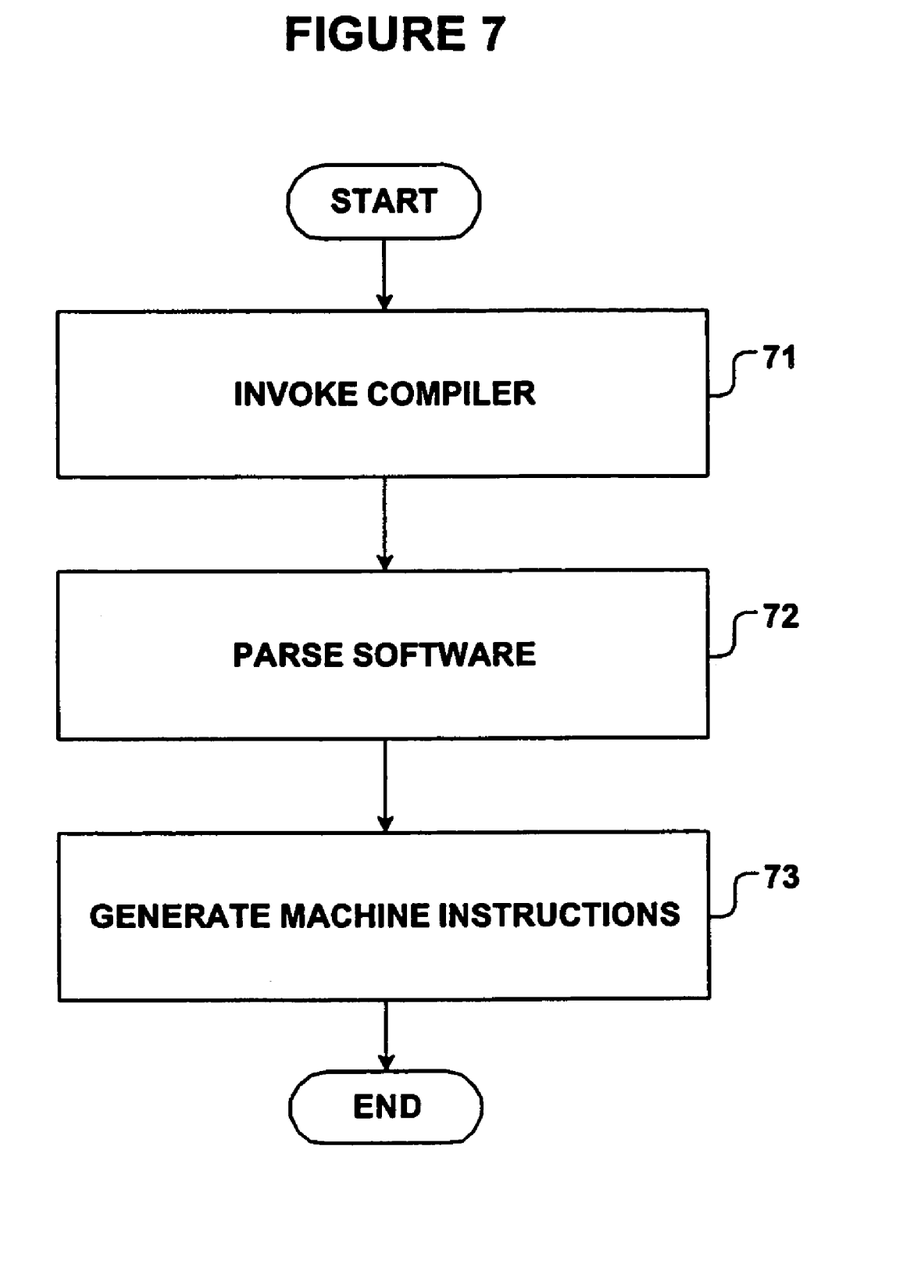

FIG. 7 is a flow diagram illustrating the process of compiling a software program to produce instructions in accordance with the invention. A software program is typically written in a high-level programming language, such as C++, that provides an easier mechanism for controlling a processor than programming in low-level machine instructions. For instance, a fairly simple software program written in a high-level programming language can generate hundreds or even thousands of machine instructions.

As shown in FIG. 7, a compiler is invoked (71). The compiler parses a software program (72), e.g., source code, and generates one or more machine instructions (73). The machine instructions generated by the compiler cause a processor to carry out the operations specified in the software program. In accordance with the invention, the compiler may generate a first machine instruction that directs programmable processor 10 to execute operations of a second instruction according to an operation mask contained within the first instruction.

The compiler may also generate the second instruction, which may include a plurality of operations that are executed according the operation mask contained within the first instruction. For example, the first instruction may be a change of flow instruction, such as a jump instruction or a conditional jump instruction. The second instruction may be a target instruction specified by the change of flow instruction. In one embodiment, the invention comprises a computer-readable medium storing a compiler that operates according to FIG. 7 as described above. In another embodiment, the invention may comprise a computer-readable medium storing the compiled machine instructions produced by the compiler.

The compiler may generate the first instructions to include a plurality of fields. For example at least one field may include bits defining whether operations within subsequent instructions are valid. Another field may include bits defining a processor mode associated with subsequent instructions. Another field may include bits defining an operation mask for masking operations of another instruction. Another field may include bits defining how subsequent instructions can be decompressed. Another field may include bits defining an address of the target instruction.

The following TABLE 1 illustrates one exemplary machine instruction format for a change of flow instruction including an operation mask according to the invention. In the example of TABLE 1, the machine instruction includes 64 bits (numbered 0 to 63).

TABLE 1

| BIT # | FIELD | DESCRIPTION |
|---|---|---|
| 63 | EV | Extension Valid. When set, bits 32 to 62 contain information that is to be used as part of the address. When clear, only the instruction address in bits 0 to 31 are valid. |
| 62 | AFV | Address and Format Valid. Indicates if the instruction address contains a valid address and a valid format code. When cleared, the extension bits 32 to 61 should be ignored. |
| 61 | UPV | UM/PIEN Valid. Indicates whether UM and PIEN fields are valid. When cleared, default values should be inserted for bits 59 and 60. |
| 60 | UM | User/Supervisor Mode. Indicates the mode. |
| 59 | PIEN | Precise Interrupt Enable. Indicates whether precise interrupts are enabled for the instruction address in bits 0 to 31. |
| 58 | OPMASK5 | Indicates whether operation 5 is enabled or masked. |
| 57 | OPMASK4 | Indicates whether operation 4 is enabled or masked. |
| 56 | OPMASK3 | Indicates whether operation 3 is enabled or masked. |
| 55 | OPMASK2 | Indicates whether operation 2 is enabled or masked. |
| 54 | OPMASK1 | Indicates whether operation 1 is enabled or masked. |
| 53-42 | — | Not used. Saved for future extensions. Value is always zero. |
| 41-32 | FMT | Contains 10 format bits related to the decompression of the instruction address specified in bits 0-31. |
| 31-0 | IA | Instruction address |

Copending and commonly assigned U.S. application Ser. No. 09/895,596, to Rudolf H. J. Bloks, entitled "CHANGE OF FLOW INSTRUCTIONS HAVING EXECUTION INFORMATION FOR A TARGET INSTRUCTION" filed Jun. 29, 2001, describes the concept of including execution information for the targeted instruction within the change of flow instruction. As described in that application, change of flow instructions may incorporate execution information to control the execution of operations in a multi-slot processor such as a VLIW processor. For example, the execution information may include an operation mask as described above. The content of the above-referenced patent application is incorporated herein by reference in its entirety.

A number of implementations and embodiments of the invention have been described. For instance, machine instructions that facilitate dynamically controlling the execution or operations within a multi-operation instruction have been described. The machine instructions may be generated by a compiler and/or executed in a processor to improve processor performance. The processor may be implemented in a variety of systems including general purpose computing systems, digital processing systems, digital televisions, laptop computers, personal digital assistants (PDAs) and cellular phones. In this context, the operation mask discussed above may be readily used to improve system performance. In such a system, the processor may be coupled to a memory device, such as FLASH memory, static random access memory (SRAM), or dynamic random access memory (DRAM) that stores an operating system and/or other software applications. Nevertheless, it is understood that various modifications may be made without departing from the spirit and scope of the invention. Accordingly, other implementations and embodiments are within the scope of the following claims.

The invention claimed is:

1. A method comprising:
    executing a plurality or operations within an instruction in a multi-slot processor,
    terminating execution of the plurality of operations when one of the operations causes an event,
    using an instruction having an operation mask, masking a subset of the operations, and re-executing the non-masked operations.

2. The method of claim 1, wherein masking the subset of the operations comprises masking the operation that caused the event.

3. The method of claim 1, wherein executing the plurality of operations comprises executing the plurality of operations in parallel.

4. The method of claim 1, further comprising servicing the event prior to re-executing the non-masked operations.

5. The method of claim 4, wherein servicing the event comprises invoking an exception handler.

6. The method of claim 1, wherein masking the operation that causes the event comprises changing a value of a bit of an operation mask, the bit corresponding the operation that causes the event.

7. The method of claim 6, wherein the operation mask is part of a different instruction.

8. The method of claim 7, wherein the different instruction is a change of flow instruction.

9. The method of claim 1, further comprising:
    terminating re-execution if another one of the operations causes a second event,
    masking a different subset of the operations using an instruction having an operation mask, and
    re-executing the non-masked operations.

10. The method of claim 9, wherein masking a different subset of the operations comprises masking the operations that cause the events.

11. The method of claim 1, wherein masking a subset of the operations includes masking a particular operation if that particular operation finishes execution prior to terminating execution of the plurality of operations.

12. The method of claim 1, wherein re-executing the non-masked operations includes propagating valid bits in pipelines of particular issue slots corresponding to the non-masked operations.

13. The method of claim 1, wherein re-executing the non-masked operations includes propagating invalid bits in pipelines of particular issue slots corresponding to the masked operations.

14. A processor comprising:
    a control unit; and
    one or more functional units coupled to the control unit, wherein the control unit:
        executes a plurality or operations within a very long instruction word in the functional units,
        terminates execution of the plurality of operations if one of the operations causes an event,
        masks the operation that causes the event in response to an operation mask of an instruction, and
        re-executes the non-masked operations.

15. The processor of claim 14, wherein the processor is a very long instruction word processor.

16. The processor of claim 14, wherein the control unit executes the plurality of operations in parallel.

17. The processor of claim 14, wherein the control unit masks the operation that causes the event by changing a value of a bit in an operation mask, the bit corresponding the operation that causes the event.

18. The processor of claim 14, wherein the control unit:
terminates re-execution if another one of the operations causes a second event;
masks the operation that causes the second event; and
re-executes the non-masked operations.

19. The processor of claim 14, wherein the control unit masks a particular operation if the particular operation finishes execution prior to terminating execution of the plurality of operations.

20. The processor of claim 14, the functional units being pipelined, wherein the control unit propagates valid bits in pipelines corresponding to the non-masked operations.

21. The processor of claim 20, wherein the control unit propagates invalid bits in pipelines corresponding to the masked operations.

* * * * *